(12) United States Patent
Kakui

(10) Patent No.: US 8,369,004 B2
(45) Date of Patent: Feb. 5, 2013

(54) MOPA LIGHT SOURCE

(75) Inventor: Motoki Kakui, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 433 days.

(21) Appl. No.: 12/790,323

(22) Filed: May 28, 2010

(65) Prior Publication Data

US 2010/0302626 A1    Dec. 2, 2010

(30) Foreign Application Priority Data

May 28, 2009    (JP) .............................. P2009-128989

(51) Int. Cl.
*H01S 3/101* (2006.01)
*H01S 3/067* (2006.01)
*H01S 3/30* (2006.01)

(52) U.S. Cl. ................. 359/333; 372/6; 372/9
(58) Field of Classification Search .................. 359/333; 372/6; *H01S 3/101, 3/067, 3/30*
See application file for complete search history.

(56) References Cited

U.S. PATENT DOCUMENTS

| | | | | |
|---|---|---|---|---|
| 6,445,724 | B2 * | 9/2002 | Abeles | 372/50.124 |
| 6,703,582 | B2 * | 3/2004 | Smart et al. | 219/121.62 |
| 6,813,429 | B2 * | 11/2004 | Price et al. | 385/125 |
| 6,917,631 | B2 * | 7/2005 | Richardson et al. | 372/5 |
| 7,535,628 | B2 * | 5/2009 | Tsuchiya et al. | 359/333 |
| 8,073,025 | B2 * | 12/2011 | Nakamae et al. | 372/25 |
| 2002/0168161 | A1 * | 11/2002 | Price et al. | 385/123 |
| 2005/0238070 | A1 * | 10/2005 | Imeshev et al. | 372/21 |
| 2005/0280887 | A1 * | 12/2005 | Betin et al. | 359/333 |
| 2006/0120418 | A1 * | 6/2006 | Harter et al. | 372/30 |
| 2007/0041083 | A1 * | 2/2007 | Di Teodoro et al. | 359/333 |
| 2007/0091948 | A1 * | 4/2007 | Di Teodoro et al. | 372/39 |
| 2008/0304137 | A1 * | 12/2008 | Kakui et al. | 359/341.3 |
| 2009/0016387 | A1 * | 1/2009 | Durkin et al. | 372/25 |
| 2009/0016388 | A1 * | 1/2009 | Gu et al. | 372/25 |

OTHER PUBLICATIONS

Yu et al., "Stable High-Power Green Light Generation with Thermally Conductive Periodically Poled Stoichiometric Lithium Tantalate", Japanese Journal of Applied Physics, vol. 43, No. 10A, pp. L1265-L1267 (2004).

* cited by examiner

*Primary Examiner* — Mark Hellner
*Assistant Examiner* — Ari M Diacou
(74) *Attorney, Agent, or Firm* — Venable LLP; Michael A. Sartori

(57) ABSTRACT

The present invention relates to a MOPA light source capable of obtaining pulse output by wavelength-conversion of pulse light of fundamental light wave using a simple configuration, and suppressing optical output using a simple method when processing is not performed. The fundamental light wave outputted from a seed light source is amplified in an optical amplification fiber. The amplified fundamental light wave is inputted to one end of a passive optical fiber, and propagates in the passive optical fiber. In the passive optical fiber, stimulated Raman scattering occurs upon propagation of the fundamental light wave. The light of fundamental light wave and light of stimulated Raman-scattered components are outputted from the other end of the passive optical fiber. The light outputted from the passive optical fiber is collimated by a lens, and is then inputted to a branching filter. The light inputted to the branching filter is wavelength-separated into light of stimulated Raman-scattered components having wavelengths longer than that of the fundamental light wave, and light having wavelengths equal to or less than that of the fundamental light wave.

7 Claims, 12 Drawing Sheets

*Fig.8*

| REPETITION FREQUENCY [kHz] | AVERAGE OUTPUT [W] | PULSE ENERGY [mJ] |
|---|---|---|
| 500 | 1.24 | 0.002 |
| 312.5 | 5.08 | 0.016 |
| 200 | 7.85 | 0.039 |
| 166.7 | 9.14 | 0.055 |
| 100 | 7.94 | 0.079 |

Fig.11

| REPETITION FREQUENCY [kHz] | AVERAGE OUTPUT [W] | PULSE ENERGY [mJ] |
|---|---|---|
| 500 | 0.45 | 0.001 |
| 312.5 | 1.70 | 0.005 |
| 200 | 5.38 | 0.027 |
| 166.7 | 5.95 | 0.036 |
| 100 | 7.42 | 0.074 |
| 79.87 | 7.07 | 0.089 |
| 50 | 4.83 | 0.097 |

MOPA LIGHT SOURCE

BACKGROUND OF THE INVENTION

1. Field of the Invention

The present invention relates to a Master Oscillator Power Amplifier (MOPA) light source.

2. Related Background of the Invention

A MOPA light source employs an optical amplifier to amplify seed light outputted from a seed light source, and outputs the amplified light. For example, a semiconductor laser is used as a seed light source, and an optical fiber amplifier is used as an optical amplifier.

Such a MOPA light source has a high degree of freedom of various conditions, such as the pulse width of output light and the repetition frequency, and so is attracting attention as a pulsed light source for laser processing, optical measurement, and various other applications. In the MOPA light source, the pulse period is not limited by the device hardware structure, as in mode-locked designs.

A MOPA light source having such characteristics is used in fine laser processing and other applications. In this case, there exists the demand that pulsed laser light irradiate only the portion to be processed, and that laser light not irradiate other portions. For example, in FIG. 1, a processing process is shown in which holes are opened by irradiating a printed board A, which is the object for processing, with laser light L. In this case, laser light L has to be irradiated positions at which holes are to be opened. However, the movement path (indicated by a dashed line in the figure) from the position at which a certain hole has been opened to the position at which the next hole is to be opened may become pads on which electronic components may be mounted, or may become a circuit pattern forming extremely fine wiring, and damage must not be imparted by the laser light irradiation.

As a MOPA light source which addresses such demands, there are Q-switch devices such as acoustooptic switches, and devices used in processing the second harmonic generation (SHG) and third harmonic generation (THG) occurring due to wavelength conversion using LBO, PPLN, or another nonlinear optical crystal. See Nan Ei Yu, Sunao Kurimura, Yoshiyuki Nomura, and Kenji Kitamura, "Stable High-Power Green Light Generation with Thermally Conductive Periodically Poled Stoichiometric Lithium Tantalate", Jpn. J. of Appl. Phys., Vol. 43, No. 10A, 2004, pp. L1265-L1267 (Document 1).

A MOPA light source comprising a Q-switch outputs only weak amplified spontaneous emission (ASE) light when not in pulsed oscillation. Consequently, there is little concern that processing may occur in intervals between two holes.

As shown in FIG. 2, a MOPA light source which performs wavelength conversion using a nonlinear optical crystal generates a harmonic component only in the pulse portion in the fundamental light wave. Hence, when a dichroic mirror or similar is used to irradiate an object for processing with only a harmonic generation component, while not irradiating the object for processing with the fundamental wave component then there is no concern that processing may occur in intervals between two holes.

SUMMARY OF THE INVENTION

The present inventors have examined conventional MOPA light sources with Q-switch devices, and as a result, have discovered the following problems.

In a MOPA light source which performs wavelength conversion using a nonlinear optical crystal, there is the concern that the nonlinear optical crystal may be damaged. Further, a nonlinear optical crystal performs wavelength conversion only for a specific polarization. Hence, when the optical amplifier included in a MOPA light source is an optical fiber amplifier, the optical fiber used for amplification has to be a polarization-maintaining fiber in order to obtain high wavelength conversion efficiency with stability. As a result, there are the problems of difficulty of connection and increased costs.

Further, in order to preserve phase-matching conditions in the nonlinear optical crystal, the spectral width of light outputted from the seed light source must be kept at approximately 0.1 nm or less. That is, nonlinear optical effects have to be adequately suppressed in the process of light propagation in the optical fiber used for amplification and in the downstream optical fiber used for delivery. Consequently, the need arises to use a LMA (Large-Mode-Area) fiber, connection and accommodation of which are difficult. On the other hand, in the case that the optical spectral width is too narrow, stimulated Brillouin scattering occurs, and the risk of damage to the light source itself increases. The nonlinear optical crystal has to be set to the optimum temperature while taking into account increases in temperature due to the high power incident light.

It is also conceivable that, by controlling the driving current supplied to a semiconductor laser as a seed light source, the optical output of the seed light source can be stopped over intervals between holes. However, in this case, the driving current normally ranges from several amperes to several tens of amperes, and so a rise time and a fall time of, at shortest, several tens of microseconds each are required. As a result, the need occurs to set the beam sweep time over intervals between holes to a longer value, and so the overall processing time, including the time for opening holes and the beam sweep time, becomes extremely long.

During the period that the seed light source optical output is stopped over intervals between holes, the optical amplifier continues in a no-input state. However, ASE light output, which is not greatly different from CW light output, continues to be outputted from the optical amplifier.

When the pulse oscillation is stopped and the seed light source is always left on, CW light output continues to be outputted. In this case, when hole-opening processing is resumed, an enormous optical surge occurs, and there are concerns that breakdown of the MOPA light source itself may ensue.

The present invention has been developed to eliminate the problems described above. It is an object of the present invention to provide a MOPA light source which uses an optical fiber amplifier to amplify light from pulse oscillation, which can obtain pulse output by wavelength conversion of pulsed light serving as fundamental light wave using a simple configuration, and which can suppress optical output using a simple method while processing is not performed.

In order to achieve the above-described objects, a MOPA light source according to the present invention comprises a seed light source, an optical fiber amplifier section, a passive optical fiber, and a branching filter. The seed light source generates pulsed light serving as fundamental light wave. The optical fiber amplifier section amplifies the fundamental light wave outputted from the seed light source. The passive optical fiber is a fiber through which the fundamental light wave amplified by the optical fiber amplifier section propagates, and generates stimulated Raman scattering upon propagation of the fundamental light wave. The branching filter wavelength-separates light of stimulated Raman-scattered components having wavelengths longer than that of the fundamental light wave, from light outputted from the passive optical fiber, and has an output port which principally outputs the light of stimulated Raman-scattered components.

It is preferable that the MOPA light source according to the present invention comprises a controller directing the seed light source to output pulsed light or CW light.

In the MOPA light source according to the present invention, it is preferable that a suppression ratio of the fundamental light wave, defined as a power ratio of the fundamental light wave in the output port of the branching filter with respect to the fundamental light wave in the input port of the branching filter, be $1/10$ or lower. Further, it is preferable that the light entrance face of the branching filter be inclined by 3° or more with respect to the direction perpendicular to an optical path of light inputted to the light entrance face.

In the MOPA light source according to the present invention, it is preferable that the seed light source have an optical amplification waveguide doped with a rare earth element, and that the amplified light serving as fundamental light wave be generated in the optical amplification waveguide. It is preferable that the wavelength of the fundamental light wave be in the 1.06 μm band. It is preferable that the seed light source be set such that the duty ratio is $1/1000$ or higher but $1/500$ or lower.

BRIEF DESCRIPTION OF THE DRAWINGS

FIG. 8 is a table summarizing the relation between the average power of output light and the pulse energy per single pulse, when the length of a passive optical fiber is 4.9 m;

FIG. 11 is a table summarizing the relation between the average power of output light and the pulse energy per single pulse, when the length of a passive optical fiber is 0.9 m.

DESCRIPTION OF THE PREFERRED EMBODIMENTS

Figure 1:
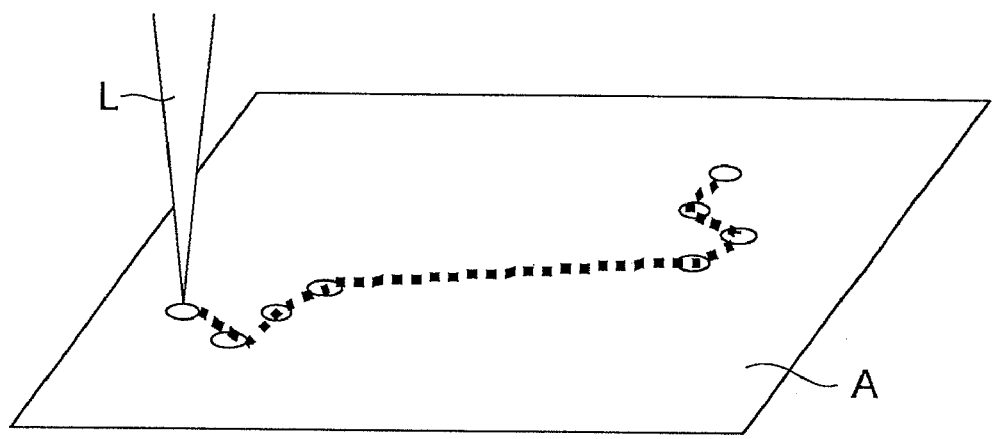
FIG. 1 shows an example of laser processing.
Figure 2:
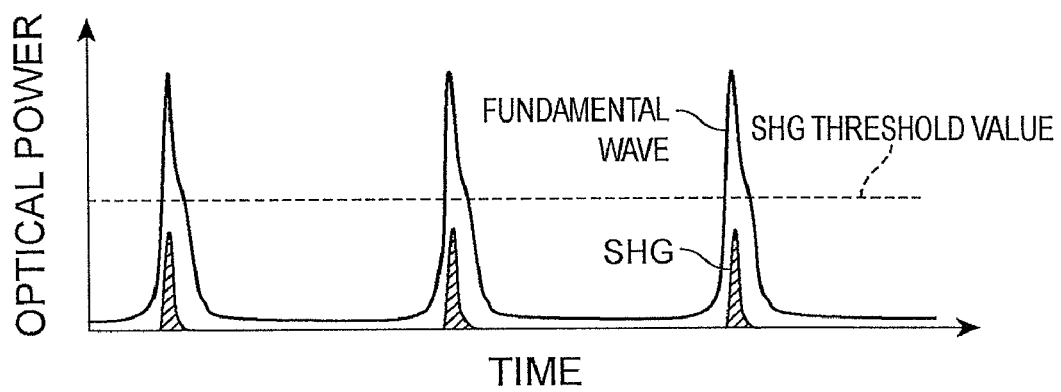
FIG. 2 is a view for explaining wavelength conversion.

In the following, embodiments of a MOPA light source according to the present invention will be explained in detail with reference to FIGS. 3-8, 9A-9E, 10-11, and 12A-12G. In the description of the drawings, identical or corresponding components are designated by the same reference numerals, and overlapping description is omitted.

Figure 3:
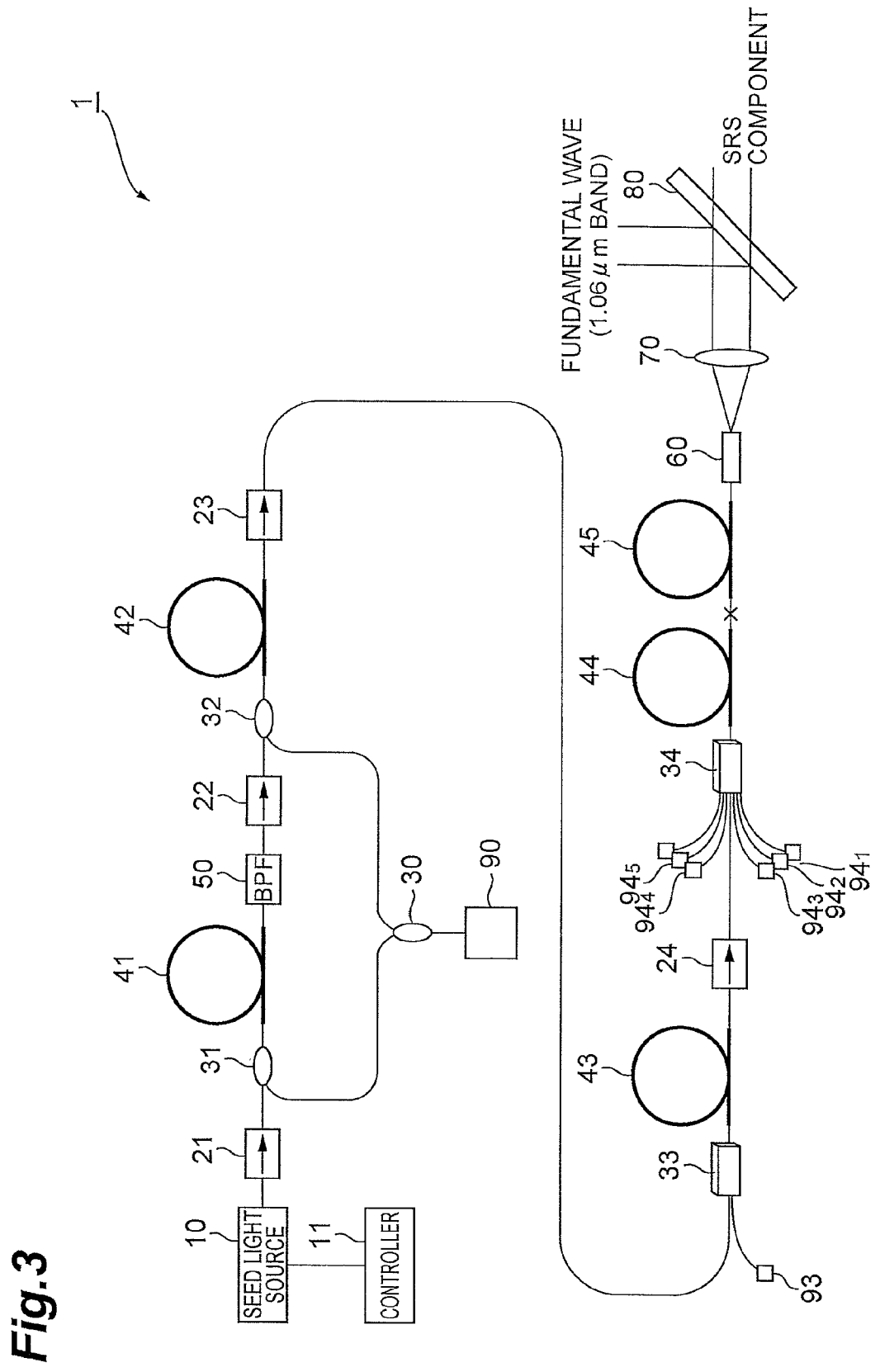
FIG. 3 is a view showing a configuration of an embodiment of a MOPA light source according to the present invention.

FIG. 3 is a view showing a configuration of an embodiment of a MOPA light source according to the present invention. The MOPA light source 1, shown in FIG. 3, comprises a seed light source 10, a controller 11, optical isolators 21 to 24, optical couplers 30 to 32, combiners 33 and 34, amplification optical fibers 41 to 44, a passive optical fiber 45, a band-pass filter 50, an end cap 60, a lens 70, a branching filter 80, and pumping light sources 90, 93, $94_1$ through $94_5$.

The seed light source 10 generates pulsed light serving as fundamental light wave. It is preferable that the seed light source 10 have an optical amplification waveguide doped with a rare earth element, and that the amplified light serving as fundamental light wave be generated in the optical amplification waveguide. It is preferable that the seed light source 10 generates fundamental light wave having a duty ratio of $1/1000$ or higher but $1/500$ or lower. The seed light source 10 is constituted by for example a semiconductor laser.

Further, it is preferable that the seed light source 10 selectively output one among pulsed light and CW light. The controller 11 directs the seed light source 10 to selectively output one among pulsed light and CW light.

Each of the optical isolators 21 to 24 transmits light in a forward direction, but blocks light heading in a reverse direction. Each of the amplification optical fibers 41 to 44 is an optical fiber doped with a rare earth element. When pumping light outputted from one among the pumping light sources 90, 93, and $94_1$ to $94_5$ is supplied through one among the optical couplers 30 through 32 and combiners 33 and 34, the rare earth element is pumped by the pumping light, and thereby light having the same wavelength as the fundamental light wave can be amplified. Each of the pumping light sources 90, 93, $94_1$ through $94_5$ is constituted by for example a semiconductor laser.

The band-pass filter 50 selectively transmits the light having the same wavelength as the fundamental light wave, among the light outputted from the amplification optical fiber 41. The passive optical fiber 45 takes as input and causes propagation of the light serving as the fundamental light wave outputted from the amplification optical fiber 44, and causes stimulated Raman scattering upon propagation of the fundamental light wave. The end cap 60 is provided at the tip of the passive optical fiber 45, and emits light from the passive optical fiber 45 to the outside. The lens 70 collimates light emitted from the end cap 60.

The branching filter 80 wavelength-separates the light wave of stimulated Raman-scattered components with wavelengths longer than the fundamental light wave from the light collimated by the lens 70, and has an output port which selectively outputs the light of stimulated Raman-scattered components. The branching filter 80 is constituted by for example a dichroic mirror, selectively transmits stimulated Raman-scattered components light with wavelengths longer than the fundamental light wave, and selectively reflects light with wavelengths equal to or less than that of the fundamental light wave. It is preferable that the suppression ratio for the fundamental light wave at the output port of the branching filter 80 be $1/10$ or less. Further, it is preferable that the branching filter 30 take as input light from a direction inclined 3° or more with respect to the direction perpendicular to the optical path of light inputted to the light entrance face.

Such a MOPA light source 1 operates as follows. The pumping light outputted from the pumping light source 90 is divided into two beams by the optical coupler 30, and one pumping light beam resulting from division into two is supplied to the amplification optical fiber 41 through the optical coupler 31, while the other pumping light beam resulting from division into two is supplied to the amplification optical fiber 42 through the optical coupler 32. The pumping light outputted from the pumping light source 93 is supplied to the amplification optical fiber 43 through the optical combiner 33. Further, the pumping light beams outputted from the pumping light sources $94_1$ to $94_5$ are supplied to the amplification optical fiber 44 through the optical combiner 34.

The light serving as fundamental light wave outputted from the seed light source 10 is inputted to the amplification optical fiber 41 through the optical isolator 21 and optical coupler 31, and is amplified in the amplification optical fiber 41. The fundamental light wave light amplified in the amplification optical fiber 41 is inputted to the amplification optical fiber 42 through the band-pass filter 50, optical isolator 22, and optical coupler 32, and is amplified in the amplification optical fiber 42.

The fundamental light wave light, which has been amplified in the amplification optical fiber 42, is inputted to the amplification optical fiber 43 through the optical isolator 23 and optical combiner 33, and is amplified in the amplification optical fiber 43. The fundamental light wave light amplified in the amplification optical fiber 43 is inputted to the amplification optical fiber 44 through the optical isolator 24 and optical combiner 34, and is amplified in the amplification optical fiber 44.

The fundamental light wave amplified in the optical fiber amplifier section including the four amplification optical fibers 41 to 44 are inputted into one end of the passive optical fiber 45, and propagate through the passive optical fiber 45. In the passive optical fiber 45, stimulated Raman scattering occurs during fundamental light wave propagation. The fundamental light wave and stimulated Raman-scattered components are outputted from the other end of the passive optical fiber 45.

Here, it is desirable that the passive optical fiber 45 have a core diameter and a core NA equal to those of the amplification optical fiber 44. When the designs of these fibers are different, splicing losses occur. In addition, since the power at the spliced portion between the amplification optical fiber 44 and the passive optical fiber 45 is high, there are concerns that optical damage may result.

The light outputted from the passive optical fiber 45 is inputted to the branching filter 80 after being collimated by the lens 70. The light inputted to the branching filter 80 is wavelength-separated into stimulated Raman-scattered component light with wavelengths longer than that of the fundamental light wave, and light with wavelengths equal to or shorter than that of the fundamental light wave.

One specific configuration example of the MOPA light source 1 is as described below. The seed light source 10 outputs light in the 1060 nm wavelength band as the fundamental light wave. Each of the amplification optical fibers 41 to 44 is an optical fiber doped with the element Yb (YbDF), and, having a core diameter of at most 10 μm, cannot be called an LMA fiber, but can easily be splice-connected and accommodated.

YbDFs have the advantages that the pumping wavelength and the wavelength of the amplified light are close, and that heat generation within the YbDF is kept low. Hence, YbDFs are preferable as optical components for application to industrial-use laser light sources.

The first-stage amplification optical fiber 41 is an Al-codoped silica-based YbDF with a single cladding structure, having an Al concentration of 5 wt %, a core diameter of 10 μm, a cladding diameter of 125 μm, and a length of 7 m. Further, the unsaturated absorption to 915 nm-band pumping light is 70 dB/m, and the unsaturated absorption peak to 975 nm-band pumping light is 240 dB/m.

The second-stage amplification optical fiber 42 is an Al-codoped silica-based YbDF with a single cladding structure, having an Al concentration of 5 wt %, a core diameter of 10 μm, a cladding diameter of 125 μm, and a length of 7 m. Further, the unsaturated absorption to 915 nm-band pumping light is 70 dB/m, and the unsaturated absorption peak to 975 nm-band pumping light is 240 dB/m.

The third-stage amplification optical fiber 43 is a phosphate glass-based YbDF with a dual cladding structure, having a P concentration of 26.4 wt %, an Al concentration of 0.8 wt %, a core diameter of 10 μm, a first cladding diameter of 125 μm, and a length of 3.6 m. The cross-section of the first cladding is octagonal. The unsaturated absorption to 915 nm-band pumping light is 1.8 dB/m.

The fourth-stage amplification optical fiber 44 is an Al-codoped silica-based YbDF with a dual cladding structure, having an Al concentration of 1.5 wt %, a core diameter of 10 μm, a cladding diameter of 128 μm, and a length of 4 m. The unsaturated absorption to 915 nm-band pumping light is 1.5 dB/m.

The wavelengths of pumping light beams outputted from each of the pumping light sources 90, 93, $94_1$ to $94_5$ are in the 0.975 μm band. The output fiber of the pumping light source 90 has a core diameter of 6 μm and an NA of 0.08. The output fibers of the pumping light sources 93 and $94_1$ to $94_5$ have a core diameter of 105 μm and an NA of 0.22. The pumping light power supplied to each of the amplification optical fibers 41 and 42 is 200 mW. The pumping light power supplied to the amplification optical fiber 43 is 2 W. The pumping light power supplied to the amplification optical fiber 44 is 30 W.

In the MOPA light source 1 having the specific configuration described above, when the seed light source 10 is caused to undergo CW operation, the optical power outputted from the end cap 60 is 18.5 W.

Figure 4:
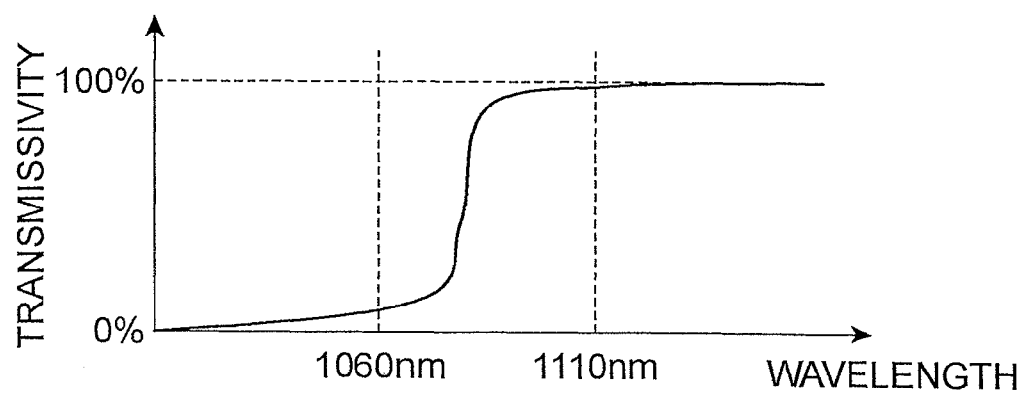
FIG. 4 is an example of the transmission spectrum of the branching filter included in the MOPA light source (FIG. 3) according to the present embodiment.

The branching filter 80 has the transmission spectrum shown in FIG. 4. A branching filter 80 having such a satisfactory wavelength separation characteristic can be realized using a dielectric multilayer film filter. In order to reduce the danger of optical damage to the branching filter 80, it is desirable that the beam diameter of light made incident on the branching filter 80 be expanded to approximately 10 mm. Further, when the branching filter 80 is installed perpendicularly to the optical path, light reflected by the branching filter 80 becomes return light, and there is the concern that the seed light source 10 may be destroyed. For this reason, as shown in FIG. 3, it is desirable that the branching filter 80 be installed at an angle of for example 45° to the optical path.

Figure 5:
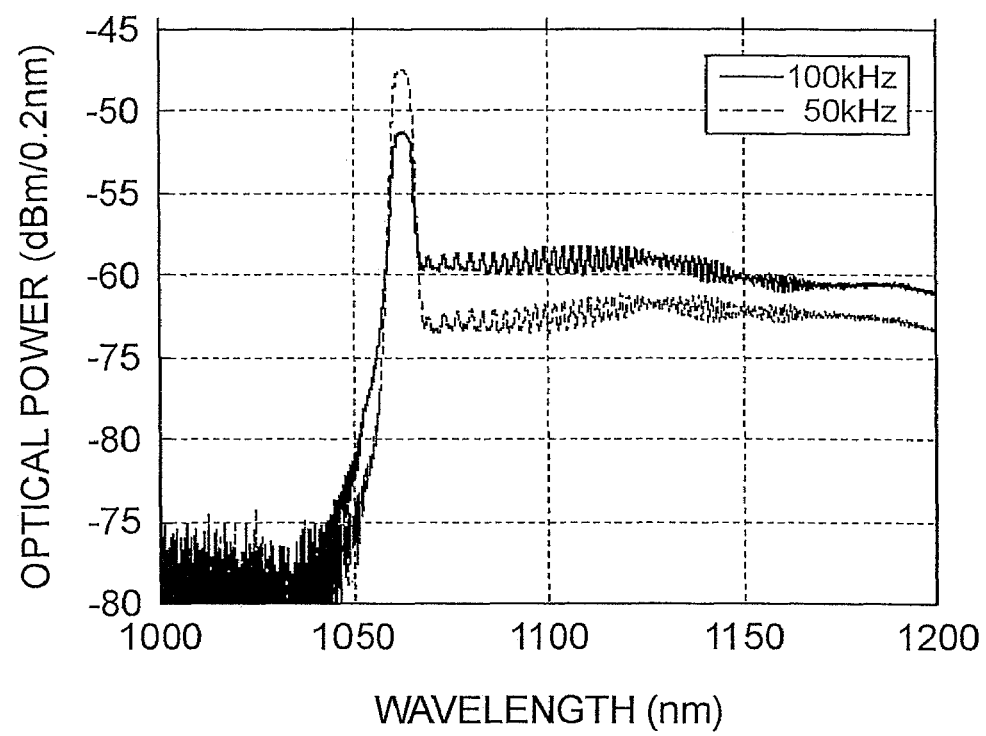
FIG. 5 shows the optical spectrum outputted from an end cap included in the MOPA light source (FIG. 3) according to the present embodiment.

The branching filter 80 blocks the 1060 nm wavelength component, and transmits only components at wavelengths longer than this. FIG. 5 shows the spectra of light outputted from the end cap 60 included in the MOPA light source 1 shown in FIG. 3. At this time, the driving current of the pumping light source 90 is set at 850 mA, The driving current of the pumping light source 93 is set at 2 A, and each driving current of the pumping light sources $94_1$ to $94_5$ is set 6 A. Teach of the repetition frequency of pulsed light outputted from the seed light source 10 was 100 kHz and 50 kHz, and the pulse width was 10 ns. As shown in FIG. 5, in the spectra of light outputted from the end cap 60, stimulated Raman-scattered components spread on the long-wavelength side of the 1060 nm band, which is the wavelength of the seed light outputted from the seed light source 10. The branching filter 80 selectively transmits such stimulated Raman-scattered components.

Figure 6:
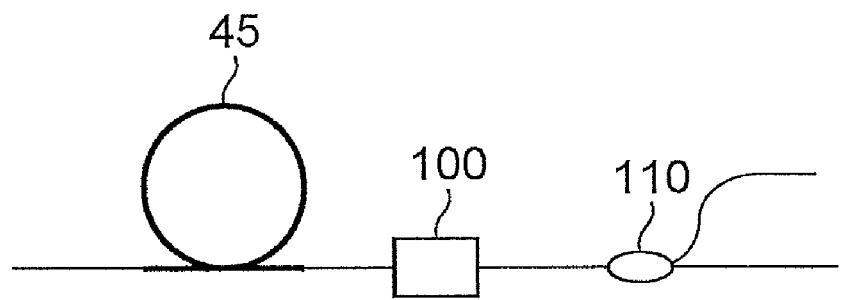
FIG. 6 is a view showing a configuration in which an optical attenuator and WDM coupler are connected to the passive optical fiber included in the MOPA light source (FIG. 3) according to the present embodiment.

The configuration shown in FIG. 6 is hypothetically considered in place of the end cap 60, lens 70 and branching filter 80 in FIG. 3. That is, the light outputted from the emission end of the passive optical fiber 45 is attenuated by an optical attenuator 100, and part of such light is then branched by a 975/1060 nm WDM coupler 110. FIGS. 7-8, 9A-9E, 10-11, 12A-12G show the results of measurements of the pulse waveforms and spectra of output light from the 975 nm output port of the WDM coupler 110.

Figure 7:
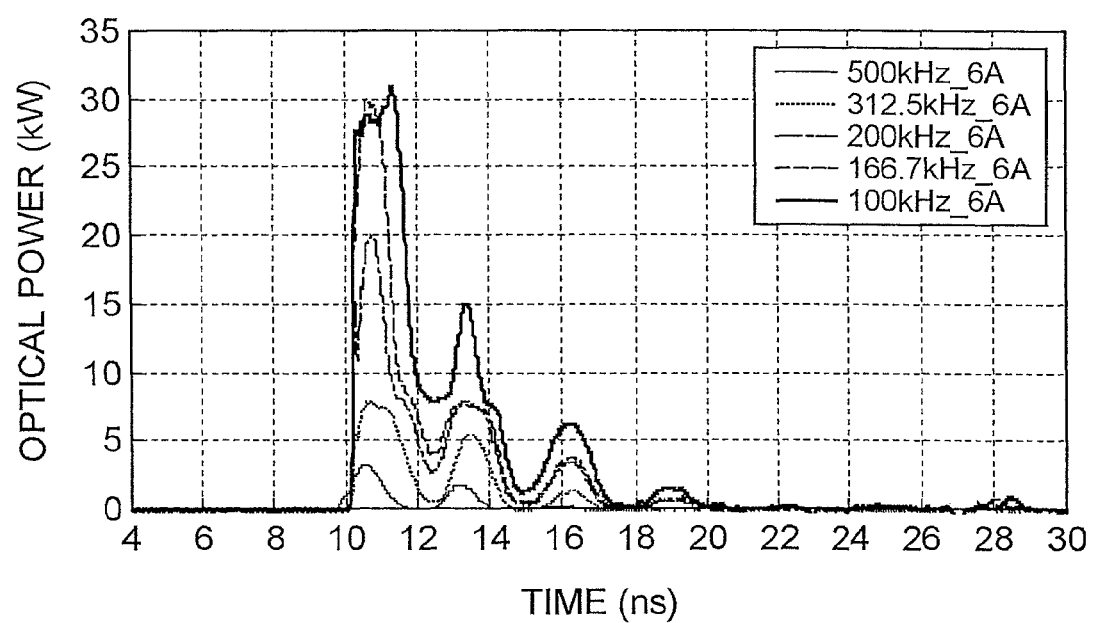
FIG. 7 shows the pulse waveform of output light when the length of a passive optical fiber is 4.9 m.
Figure 9A:
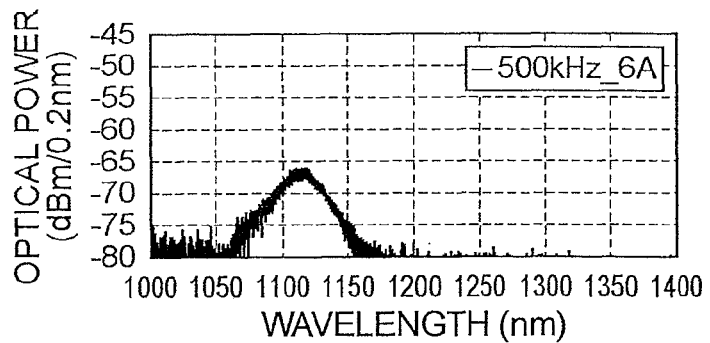
FIGS. 9A to 9E show the spectra of output light when the length of a passive optical fiber is 4.9 m, respectively.
Figure 9B:
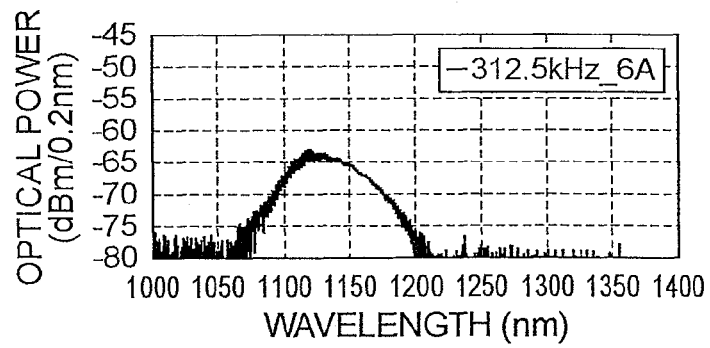
Figure 9C:
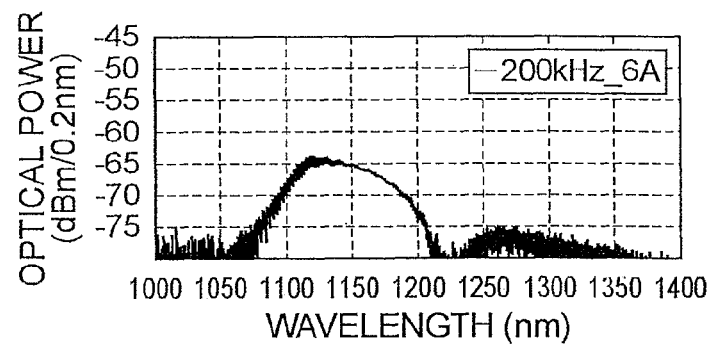
Figure 9D:
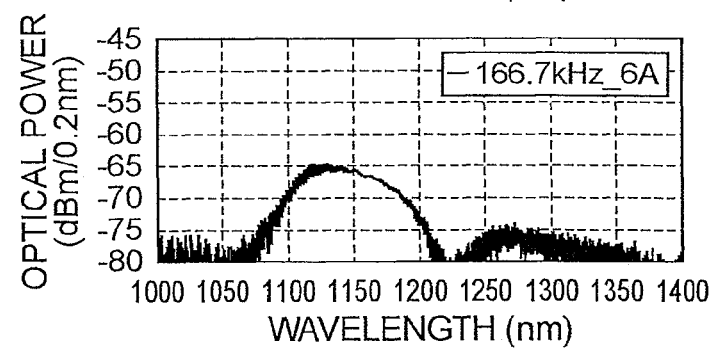
Figure 9E:
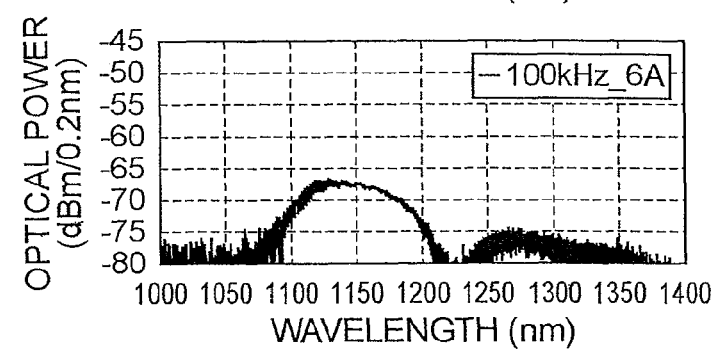

FIGS. 7-8, 9A-9E, 10-11, 12A-12G are views showing output light characteristics when the length of the passive optical fiber 45 was 4.9 m. In particular, FIG. 7 shows pulse waveforms of the output light (driving current: 6 A; and repetition frequency: 500 kHz, 312.5 kHz, 200 kHz, 166.7 kHz, and 100 kHz). FIG. 8 is a table summarizing the relation between the average output of output light and the pulse energy per single pulse. Further, FIGS. 9A to 9E are the output light spectra when the length of a passive optical fiber is 4.9 m, respectively. In concrete taw's, FIG. 9A shows an output light spectrum in the condition that a repetition frequency is set at 500 kHz and a driving current is set at 6 A, FIG. 9B shows an output light spectrum in the condition that a repetition frequency is set at 312.5 kHz and a driving current is set at 6 A, FIG. 9C shows an output light spectrum in the condition that a repetition frequency is set at 200 kHz and a driving current is set at 6 A, FIG. 9D shows an output light spectrum in the condition that a repetition frequency is set at 166.7 kHz and a driving current is set at 6 A, and FIG. 9E shows an output light spectrum in the condition that a repetition frequency is set at 100 kHz and a driving current is set at 6 A. When the length of the passive optical fiber 45 was made 4.9 m, no stimulated Raman scattering occurred at a pulse repetition frequency of 79.87 kHz or lower, regardless of the length. Hence, in FIGS. 7-8, and 9A-9E, the pulse frequency is made 100 kHz or higher.

Figure 10:
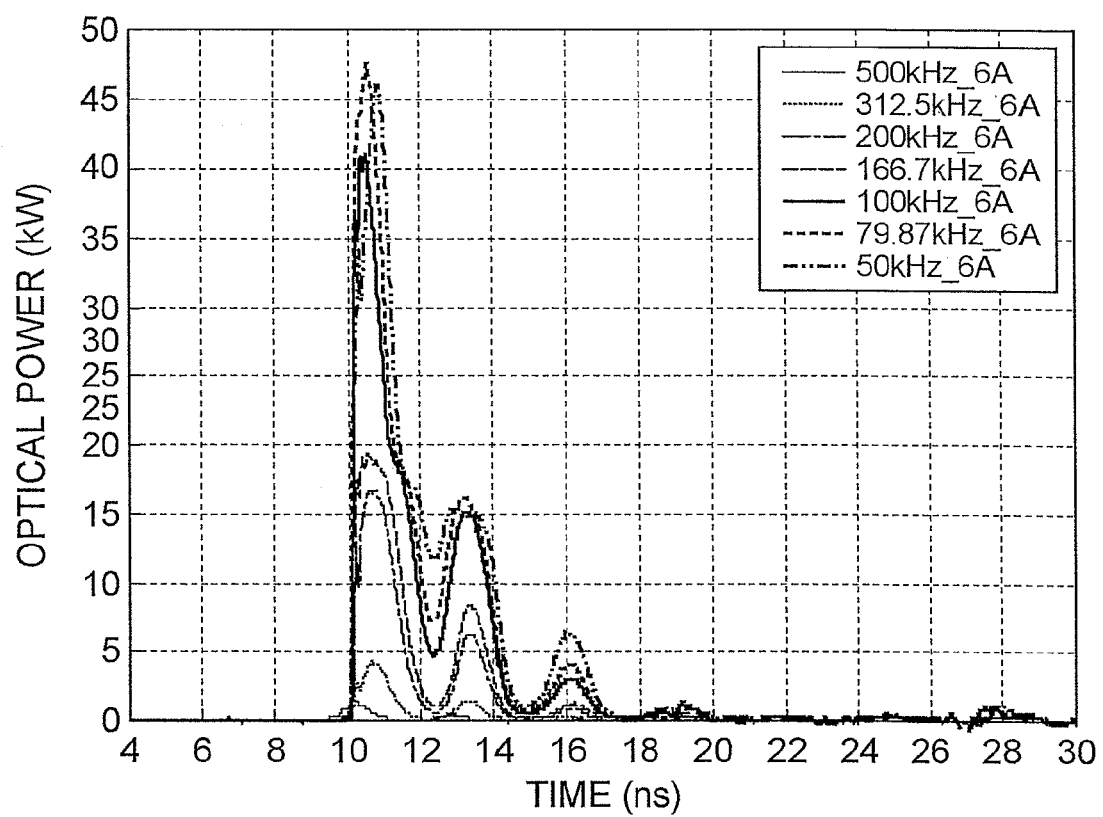
FIG. 10 shows the pulse waveform of output light when the length of a passive optical fiber is 0.9 m.
Figure 12A:
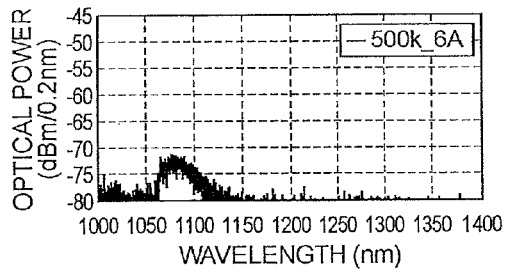
FIGS. 12A to 12G show the spectra of output light when the length of a passive optical fiber is 0.9 m, respectively.
Figure 12B:
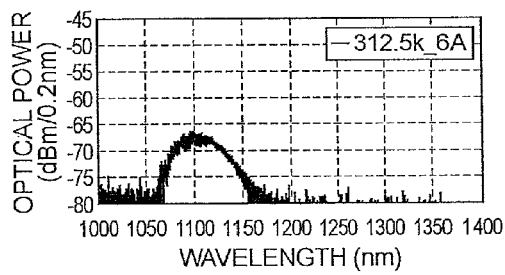
Figure 12C:
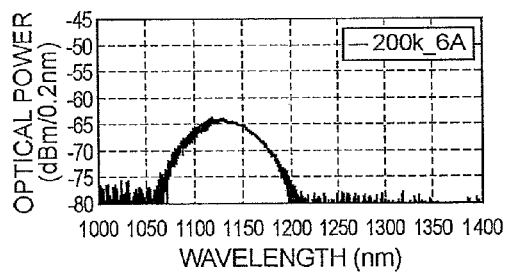
Figure 12D:
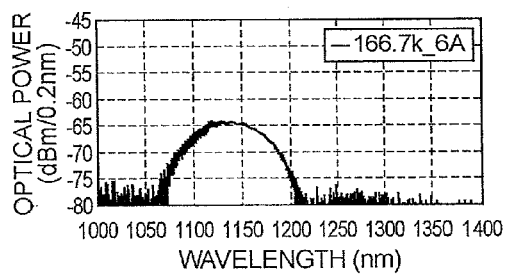
Figure 12E:
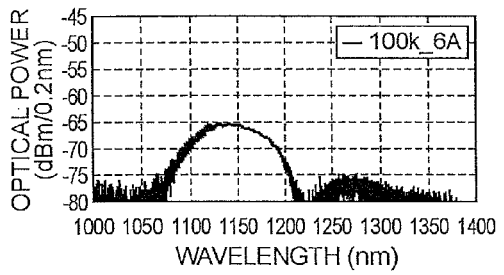
Figure 12F:
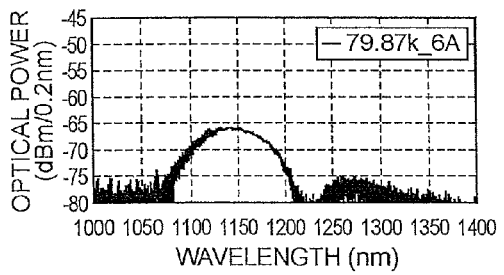
Figure 12G:
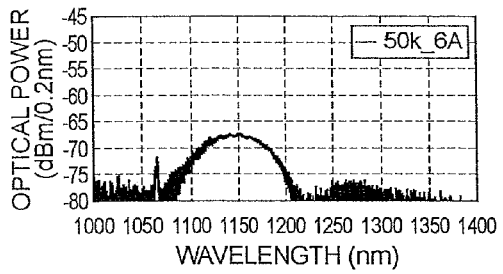

FIGS. 10-11 and 12A-12G show output light characteristics when the length of the passive optical fiber 45 was 0.9 m. In particular, FIG. 10 shows pulse waveforms of the output light (driving current: 6 A; and repetition frequency: 500 kHz, 312.5 kHz, 200 kHz, 166.7 kHz, 100 kHz, 79.87 kHz, and 50 kHz). FIG. 11 is a table summarizing the relation between the average output of output light and the pulse energy per single pulse. Further, FIGS. 12A-12G are the output light spectra when the length of a passive optical fiber is 0.9 m, respectively. In concrete terms, FIG. 12A shows an output light spectrum in the condition that a repetition frequency is set at 500 kHz and a driving current is set at 6 A, FIG. 12B shows an output light spectrum in the condition that a repetition frequency is set at 312.5 kHz and a driving current is set at 6 A, FIG. 12C shows an output light spectrum in the condition that a repetition frequency is set at 200 kHz and a driving current is set at 6 A, FIG. 12D shows an output light spectrum in the condition that a repetition frequency is set at 166.7 kHz and a driving current is set at 6 A, FIG. 12E shows an output light spectrum in the condition that a repetition frequency is set at 100 kHz and a driving current is set at 6 A, FIG. 12F shows an output light spectrum in the condition that a repetition frequency is set at 79.87 kHz and a driving current is set at 6 A, and FIG. 12G shows an output light spectrum in the condition that a repetition frequency is set at 50 kHz and a driving current is set at 6 A. When the length of the passive optical fiber 45 was made 0.9 m, the pulse peak reached 50 kW in the pulse repetition frequency of 79.87 kHz.

Further, the output light pulse waveforms of FIGS. 7 and 10 are values after correction for loss in the optical attenuator 100.

In order to raise the pulse peak, it is important that the pulse repetition frequency be lowered, and to this end it is important that the passive optical fiber 45 be made short. On the other hand, in order to raise the conversion efficiency, it is important that the passive optical fiber 45 be made long. That is, the lengths 4.9 m and 0.9 m of the passive optical fiber 45 are substantially equivalent to the upper limit and the lower limit to the delivery fiber length in a practical laser processing light source apparatus.

When the length of the passive optical fiber 45 was made 4.9 m, and when the pulse repetition frequency was 166.7 kHz, the pulse peak maximum reached 30 kW. Even when the pulse repetition frequency fell to 100 kHz from this, the pulse peak did not increase greatly, and the pulse peak remained at 30 kW at most. And, the average output was at maximum in excess of 9 W when the pulse repetition frequency was 166.7 kHz, equivalent to approximately half the optical output of 18.5 W when in the above-described CW operation. This 50% conversion efficiency is comparable to the SHG conversion efficiency described in Document 1, above, and is higher than for the THG.

On the other hand, when the length of the passive optical fiber 45 was made 0.9 m, the average output reached 7.4 W when the pulse repetition frequency was 100 kHz, as indicated in FIG. 11, and while the conversion efficiency remained at approximately 40%, the pulse peak reached close to 50 kW.

In other words, at the time that the length of the passive optical fiber 45 is adjusted appropriately together with the pulse repetition frequency according to the object for processing, it is expected that the combination of a desired peak power and pulse repetition frequency can be realized.

In accordance with the present embodiment, cost increases and degraded reliability when using a nonlinear optical crystal, as well as increases in cost and number of manufacturing processes when employing a structure to maintain polarization in the optical fiber amplifier section, can be avoided. Further, there is no need to introduce LMA fiber in order to avoid nonlinear effects of the optical fiber amplifier section.

The duty ratio of the fundamental light wave outputted from the seed light source 10 is preferably $1/1000$ or higher but $1/500$ or lower. The upper limit of the duty ratio is set as a limit for which the pulse peak does not become small. And, the lower limit of the duty ratio is set as the lowest-limit ratio for maintaining Raman conversion efficiency.

The present invention is not limited to the above embodiments, and various modifications are possible. For example, the fundamental light wave and the stimulated Raman-scattered components on the short-wavelength side which are reflected in the branching filter 80 may be used in processing separately from the stimulated Raman-scattered components on the long-wavelength side.

Further, while not processing, by switching the seed light source 10 to CW light output through control by the controller 11, stimulated Raman-scattered components are not generated from the passive optical fiber 45, and so outputted from the output port of the branching filter 80 of stimulated Raman-scattered components on the long-wavelength side becomes substantially zero. The ASE light components on the short-wavelength side of the fundamental light wave are eliminated by the branching filter 80.

Further, the length of the passive optical fiber 45 is limited to certain values in order to perform wavelength conversion, and so there are cases in which the length is inadequate for delivery. In such cases, a separate optical fiber for delivery, in which stimulated Raman scattering does not readily occur, may be arranged in a portion of the optical system propagation path beyond the branching filter 80.

As described above, the MOPA light source according to the present invention can perform wavelength conversion of fundamental light wave pulses using a simple configuration to obtain a pulse output, and moreover can suppress optical output while processing is not performed using a simple method.

What is claimed is:

1. A MOPA light source, comprising:
   a seed light source generating pulsed light serving as fundamental light wave;
   an optical fiber amplifier section amplifying the fundamental light wave outputted from the seed light source;
   a passive optical fiber propagating the fundamental light wave amplified by the optical fiber amplifier section, and generating stimulated Raman scattering upon the propagation of the fundamental light wave; and
   a branching filter wavelength-separating light of stimulated Raman-scattered components, each having a wavelength longer than that of the fundamental light wave, from light outputted from the passive optical fiber, the branching filter having an output port which principally outputs the light of stimulated Raman-scattered components.

2. A MOPA light source according to claim 1, further comprising a controller controlling the seed light source such that the seed light source outputs pulsed light or CW light.

3. A MOPA light source according to claim 1, wherein a suppression ratio of the fundamental light wave at the output port of the branching filter is $1/10$ or lower.

4. A MOPA light source according to claim 1, wherein a light entrance face of the branching filter is inclined by 3° or more with respect to a direction perpendicular to an optical path of light inputted to the light entrance face.

5. A MOPA light source according to claim 1, wherein the seed light source includes an optical amplification waveguide doped with a rare earth element, and amplified light of the fundamental light wave is generated in the optical amplification waveguide.

6. A MOPA light source according to claim 1, wherein the wavelength of the fundamental light wave is in the 1.06 μm band.

7. A MOPA light source according to claim 1, wherein the seed light source is set such that a duty ratio becomes $1/1000$ or higher and $1/500$ or lower.

* * * * *